INJECTION MOLDING MACHINE

Original Filed Feb. 19, 1968 3 Sheets-Sheet 1

INVENTOR.
OSKAR R. JOHANSSON
BY Howard J. Kirsch
Ernst H. Ruf
ATTORNEYS

INJECTION MOLDING MACHINE

Original Filed Feb. 19, 1968 3 Sheets-Sheet 2

INJECTION MOLDING MACHINE

Original Filed Feb. 19, 1968 3 Sheets-Sheet 3

United States Patent Office

Re. 27,979
Reissued Apr. 23, 1974

27,979

INJECTION MOLDING MACHINE

Oskar R. Johansson, Cincinnati, Ohio, by Cincinnati Milacron Inc., assignee

Original No. 3,509,601, dated May 5, 1970, Ser. No. 706,418, Feb. 19, 1968. Application for reissue Sept. 15, 1972, Ser. No. 289,623
Int. Cl. B29f *1/04*
U.S. Cl. 259—191 12 Claims

Matter enclosed in heavy brackets [ ] appears in the original patent but forms no part of this reissue specification; matter printed in italics indicates the additions made by reissue.

ABSTRACT OF THE DISCLOSURE

In a reciprocating screw injection molding machine wherein independently controlled rotary and axial movements are imparted to the plasticizing screw by a piston-cylinder motor having its reciprocable piston slidingly driven by a rotary splined shaft driven by a separate motor means, the improvement which comprises interposing and extending a sleeve, fixed on one end relatively to the cylinder, for a substantial distance between the piston and a driving cap co-axial with and fixedly attached to the piston and the plasticizing screw, with the driving cap also being in sliding, driving engagement wth the rotary splined shaft, thus permitting sealing of the piston inner peripheral surface against the smooth outer peripheral surface of the interposed sleeve.

Background of the invention

This invention relates to injection molding machines, particularly to the reciprocating screw type machine suitable for the injection molding of plastic and elastomeric materials. Conventional molding apparatus of the reciprocating-rotating screw type usually includes an injection cylinder or chamber having a bore, wherein the plasticizing screw rotates in such a manner so as to allow the solid molding material to enter the cylinder and be plasticized as it advances in the direction of screw feed. Attached on one end of the injection cylinder is a nozzle in communication with a mold sprue. As the plasticized material is deposited at the metering or front end of the plasticizing screw, it develops a back pressure that forces the plasticizing screw to retract in the cylinder bore and when the plasticized material reaches a predetermined volume, or shot size, the retracting screw contacts a limit switch and stops its rotation. At this stage, the shot is ready for injection into the mold, generally upon receipt of a signal that the mold is ready for injection, whereupon the plasticizing screw is driven forward hydraulically to inject the shot. Upon receipt of another signal, the plasticizing screw again starts to rotate and gradually retracts as a fresh shot is built up in the injection cylinder. Thus, the plasticizing screw reciprocates once per machine cycle to plasticize and inject a shot of material.

In order to perform its plasticizing and injection functions a plasticizing screw must have imparted to it both rotary and axial movements which must be independently controllable without interfering with each other. A known way to accomplish these functions is to utilize a piston-cylinder motor including a piston received in the cylinder for a rotary movement about its axis relatively to the cylinder and for axial movement relative to the cylinder, with the cylinder being fixed and the piston having a plasticizing screw attached thereto for rotation and axial movement and a rotary splined shaft, driven by a motor means and fixed against axial movement relative to the cylinder, extending co-axially with the piston-cylinder motor into sliding driving engagement with the piston. This construction though workable, suffers from a serious defect, namely in that it requires sealing against a spline which upon axial movement of the pistons produces almost certain leakage of fluid into the splined bore of the piston from whence it will again have to be displaced by leakage past the splines upon reverse axial movement of the piston. In addition, purging of the leaked fluid from the piston bore produces a rearward reaction on the end surface of the splined rotary shaft which recessitates the incorporation of a thrust race or bearing in the cylinder or motor means.

Summary of the invention

This invention solves the previously mentioned problems by interposing and extending a sleeve, fixed on one end relatively to the cylinder, for a substantial distance between the piston and a driving cap, with the driving cap being co-axial with and fixedly attached to the piston and plasticizing screw, as well as being in sliding driving engagement with the rotary splined shaft, thus permitting the sealing of the piston inner peripheral surface by the use of piston rings against the smooth outer peripheral surface of the interposed sleeve, with no end thrust race or bearing being required to take up the shaft reaction.

In summary, this invention provides an injection molding machine comprising in combination a plasticizing chamber with a through passage, a nozzle thereon for connection to a mold, a plasticizing screw in the passage, means for admitting molding material to the screw, a driving cap capable of simultaneous rotation and axial displacement secured to the plasticizing screw, a rotatable drive shaft slidingly secured to the driving cap, motor means for rotating the drive shaft, a rotatable axially displaceable piston secured to and spatially surrounding a substantial portion of the driving cap, a fluid pressure actuated cylinder surrounding the piston, and a sleeve fixed on one end relatively to the cylinder and extending for substantial distance between the piston and the driving cap whereby the screw is axially displaceable relative to the drive shaft and both axially and rotationally displaceable with the piston. In addition, pluralities of inner and outer piston rings in the piston head sealingly engage the outer peripheral surface of the fixed sleeve and the inner peripheral surface of the injection cylinder respectively.

Other features and advantages to the present invention should be readily apparent by reference to the following specification, considered in conjunction with the accompanying drawings and it is to be understood that any modification may be made in the exact structural details there shown and described, within the scope of the appended claims without departing from or exceeding the spirit of the invention.

Drawing description

Detailed description

Figure 1:
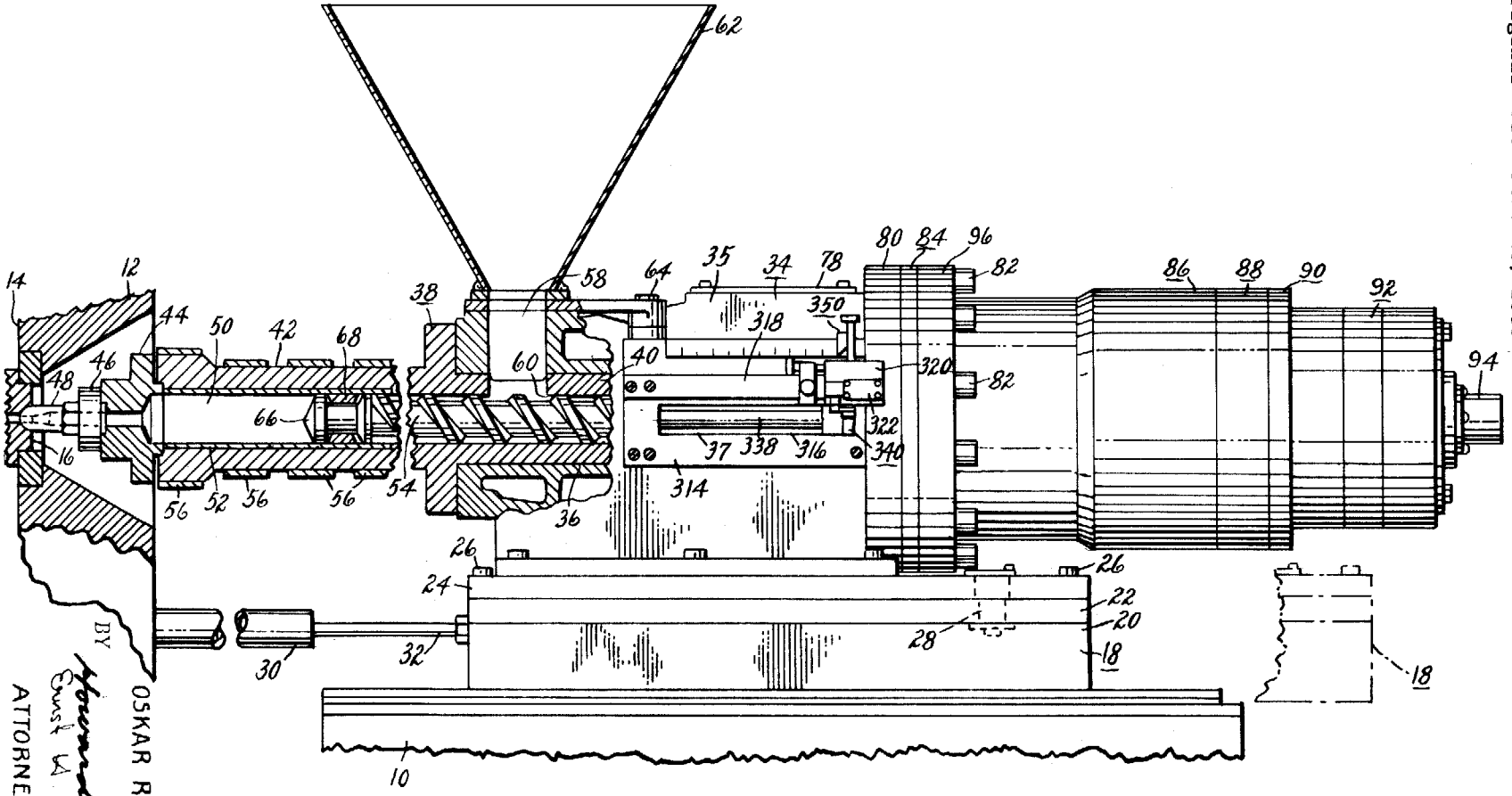
FIG. 1 is an elevational view, partly in section of an injection molding machine.

Referring now to the drawings in detail FIG. 1 shows the injection molding machine comprising machine frame 10, only a small portion of which is shown in the figure and which supports platen 12 having vertical rear face 14 against which a mold 16 is clamped. A base 18 is slidably mounted on another part of frame 10 and is connected to platen 12 by hydraulic cylinder 30 having ram 32 connected to base 18. Base 18 is basically composed of bed portion 20 having attached thereto intermediate plate 22 and top plate 24. Swivel pin means 28 extends through plates 22 and 24 into bed portion 18 and upon removal of screws 26 top plate 24 may be swiveled around pin means 28 in a plane parallel to the top surface of plate 22.

Mounted on base 18 is housing 34 having an open central bore portion 36 into which rear portion 40 of plasticizing chamber or cylinder 38 is fixedly slide-fitted. Front portion 42 of plasticizing chamber 38 extends outwardly from housing 34 and is closed off by cylinder end plate 44 having nozzle adaptor 46 and nozzle 48 attached thereto. Plasticizing chamber 38 is a long cylindrical chamber with circular through passage 50 having liner 52, which passage 50 is occupied by rotatable and reciprocable plasticizing screw 54. Surrounding plasticizing cylinder front portion 42 are a plurality of heating elements 56. Housing 34 has inlet throat 58 aligned with opening 60 in plasticizing chamber rear portion 40. Material to be plasticized is fed from hopper 62, located above inlet throat 58 and pivotable around pin 64 on housing 34, through throat 58 and opening 60 into plasticizing chamber 38 where it will be transported upon rotation of plasticizing screw 54 toward the left as viewed in FIG. 1 and becomes gradually plasticized by the heat imparted by heating elements 56. Attached to the end of plasticizing screw 54 nearest to nozzle 48 is screw tip 66 having anti-flowback valve 68 interposed therebetween.

Figure 2:
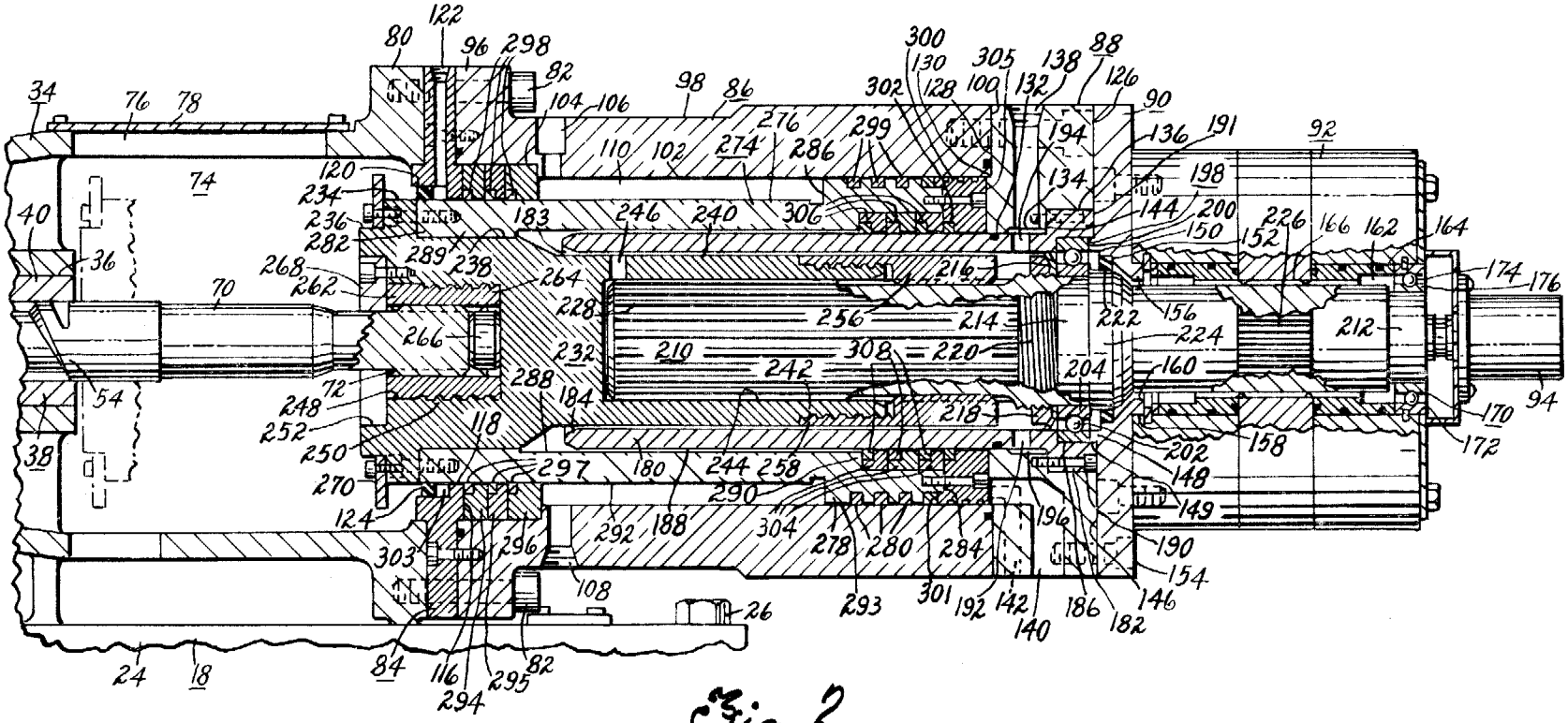
FIG. 2 is a longitudinal sectional view of the injection unit drive means.

As best seen in FIG. 2 plasticizing screw 54 has spindle end portion 70, having splined portion 72, extending into housing cavity 74, access to which may be had through housing opening 76 closed by cover 78. Attached to housing rear flange 80 by bolts 82 are retainer 84 and injection cylinder 86, the latter having attached to it end cap 88, adaptor plate 90, and motor means 92 having tachometer drive means 94 all of which will now be described in detail.

Referring now to FIG. 2, which is a longitudinal view of the injection unit drive means, stepped injection cylinder 86, having flanged end portion 96 attached to housing rear flange 80, has body portion 98 with rear end face 100, inner peripheral surface 102 with recessed portion 104, cylinder cavity 110 and aligned circumferentially spaced radial openings 106, 108 located near inner peripheral surface recessed portion 104. Interposed between housing rear flange 80 and injection cylinder flanged end portion 96 and attached to the latter is generally annular shaped retainer 84 having end surface 116, inner peripheral surface 118 with recessed portion 120 and radial opening 122 extending outwardly from portion 120. Attached to injection cylinder 86 and abutting cylinder end face 100 is generally annular shaped end cap 88 having rear end surface 126, front end surface 128 having stepped portion 130, inner peripheral surface 132 having stepped portions 134, 136, separated by step wall 144, radial opening 138 extending outwardly from stepped portion 134, and L-shaped circumferentially spaced openings 140, 142 initially perpendicular to stepped front end surface portion 130 and then extending radially outwardly parallel to rear end surface 126. Secured to end cap 88 and abutting end cap rear end surface 126 is generally annular-shaped adaptor plate 90 composed of front end surface 146 having stepped portion 148 and recessed portions 150, 152, rear end surface 154 having stepped portion 156 with outer peripheral surface 158, and stepped inner peripheral surface 160. Fixedly attached to adaptor plate 90 and abutting adaptor plate rear end surface 154 is generally annular motor means 92 having internal driving splines 166 extending into motor means central bore 162 having inner peripheral surface 164. Adaptor plate rear end surface stepped portion 156 extends a short distance into central bore 162 with one end of inner peripheral surface 164 being located on the outer peripheral surface 158 of stepped portion 156. Secured to and extending a short distance into the other end of bore inner peripheral surface 164 is outer race 172 of bearing 170 also having rolling element 174 and inner race 176.

Fixedly secured to end cap 88 is stepped rear portion 182 of sleeve 180 axially freely extending into injection cylinder cavity 110 and having inner cavity 183, inner peripheral surface 184 with stepped portion 186, outer peripheral surface 188 with stepped portion 190, rear end surface 191 and aligned circumferentially spaced radial openings 192, 194. Sleeve outer surface stepped portion 190 fits into end cap stepped portion 136, and end cap inner peripheral surface 132 sealingly engages a portion of sleeve outer peripheral surface 188, with sleeve outer peripheral surface 188 extending over end cap interior peripheral surface stepped portion 134 so as to define annular channel 196. Extending radially outwardly from annular channel 196 is end cap radial opening 138 and extending radially inwardly from annular channel 196 are radial openings 192, 194, thus allowing communication from sleeve inner cavity 183 through radial openings 192, 194, into annular channel 196 and radial opening 138. Adaptor plate front end stepped portion 148 extends a short distance into sleeve inner peripheral surface stepped portion 186 with adaptor plate front end stepped portion outer peripheral surface 149 being located thereon.

Abutting retainer front end surface stepped portion 148 and located and retained on sleeve inner peripheral surface stepped portion 186 is outer race 200 of bearing 198 also having rolling element 202 and inner race 204.

Journaled by bearings 170 and 198 and axially extending into sleeve inner cavity 183 is stepped cylindrical drive shaft 210, which also doubles as the output shaft of motor means 92. Drive shaft 210 having its journal portions 212 and 214 surrounded by bearing inner races 176 and 204 respectively, is restrained against actual movement by lock washer 216 pressed against bearing inner race 204 by lock nut 218 threaded onto drive shaft threaded portion 220. Shaft seal 222, secured between adaptor plate front end surface recessed portion 152 and adaptor plate stepped inner peripheral surface 160, seals against shaft journal portion 224. Mating with motor means internal driving splines 166 is drive shaft first splined portion 226. Extending from drive shaft threaded portion 220 for a substantial distance into sleeve inner cavity 183 and axially aligned therewith is drive shaft second splined portion 228.

Stepped cylindrical driving cap 232 axially aligned with both drive shaft 210 and plasticizing screw 54 and axially extending from injection cylinder cavity 110 a short distance into housing cavity 74, has concentric portions 234, 236, 238, 240 of decreasing diameter, with portion 240 having stepped left-hand acme threaded portion 242. A substantial length of driving cap portion 240 which has an outside diameter slightly less than the inside diameter of sleeve inner peripheral surface 184 has concentric internally splined bore 244 with opening 246, located near the inner end of bore 244, extending radially outwardly therefrom normal to driving cap portion 240. A substantial length of driving cap portions 236, 234, and 238 have concentric bore 248 having inner left-hand acme threaded portion 250 and outer recessed portion 252. Axially abutting driving cap portion 240 and mating threaded portion 242 with threaded portion 258 is generally annular shaped drive spline extension 256 preferably made of bronze and having substantially the same outside diameter and substantially the same internally splined bore as driving cap portion 240. As shown in FIG. 2, drive shaft second splined portion 228 is axially aligned with and extends through drive spline extension 256 into driving cap internally splined bore 244.

Internally splined driving cap bushing 262 having partially threaded outside diameter portion 264 is inserted into and mates with threaded portion 250 of driving cap bore portion 248. Plasticizing screw 54 is axially aligned with driving cap 232 and plasticizing screw splined portion 72 is inserted into splined bushing 262 and abuts spacer 266. Stop plate 268 is inserted into and secured in recessed portion 252 of bore 248 and restrains plasticizing screw splined portion 72 against axial movement with respect to splined bushing 262 and driving cap 232. Annular cam 270, larger in outside diameter than driving cap 232, is fitted on driving cap concentric portion 236 and butts and is secured to concentric portion 234.

Annular double acting piston 274 having recessed skirt portion 276 with end 282, head portion 278 with stepped top surface 284, bottom surface 286 and multiple outer circumferential recesses 280 is co-axial with driving cap 232 and has inner peripheral surface 288 with head interior recess portion 290 wherein the diameter of inner peripheral surface 288 is slightly larger than the diameter of sleeve outer peripheral surface 188. Raised portion 289 of piston inner peripheral surface 288 matingly fits around driving cap portion 238 with skirt end portion 282 being attached to driving cap portion 234. The diameter of outer peripheral surface 292 of piston skirt portion 276 is substantially similar to the diameter of driving cap portion 234 and slightly less than the diameter of retainer inner peripheral surface 118, while the diameter of outer peripheral surface 293 of piston head portion 278 is only slightly less than the diameter of injection cylinder inner peripheral surface 102. Held against movement in injection cylinder recessed portion 204 by retainer rear end surface 116 are three stationary retainer rings 294, 295, 296, each having an inner circumferential recess 297, with each recess 297 containing a piston ring 298 bearing and sealing against piston skirt outer peripheral surface 292. Retainer ring 296 is preferably made of bronze, has rear surface 291 and inner peripheral surface 310, with the diameter of the latter being substantially similar to the diameter of piston skirt outer peripheral surface 292. Seal 124, held in retainer inner peripheral surface recessed portion 120, seals against piston skirt outer peripheral surface 292 and helps define peripheral channel 303 from which opening 122 extends radially outwardly.

Outer circumferential recesses 280 in piston bead portion 278 each contain a piston ring 299 bearing and sealing against injection cylinder internal peripheral surface 102. Interposed between stepped top surface 284 of piston head portion 278 and end cap front end surface stepped portion 130 and attached to piston head portion 278 is movable retainer ring 300 having flat front surface 305, stepped rear surface 301, and inner circumferential recess 302, with stepped rear surface 301 mating with piston head portion stepped top surface 284. Movable retainer ring 300, which is preferably made of bronze, has the diameter of outer peripheral surface 312 substantially similar to the diameter of injection cylinder inner peripheral surface 102. Secured in piston head interior recessed portion 290 by movable retainer ring stepped surface 301 are three retainer rings 304, each having an inner circumferential recess 306 and each containing, in addition to retainer ring circumferential recess 302, a piston ring 308 bearing and sealing against sleeve outer peripheral surface 188.

From the preceding description it may be seen that, since the diameter of driving cap portion 240 is slightly less than the diameter of sleeve inner peripheral surface 184 and the diameter of piston inner peripheral surface 288 is slightly greater than the diameter of sleeve outer peripheral surface 188, sleeve 180 can extend for a substantial distance between piston inner peripheral surface 288 and driving cap portion 240.

Figure 3:
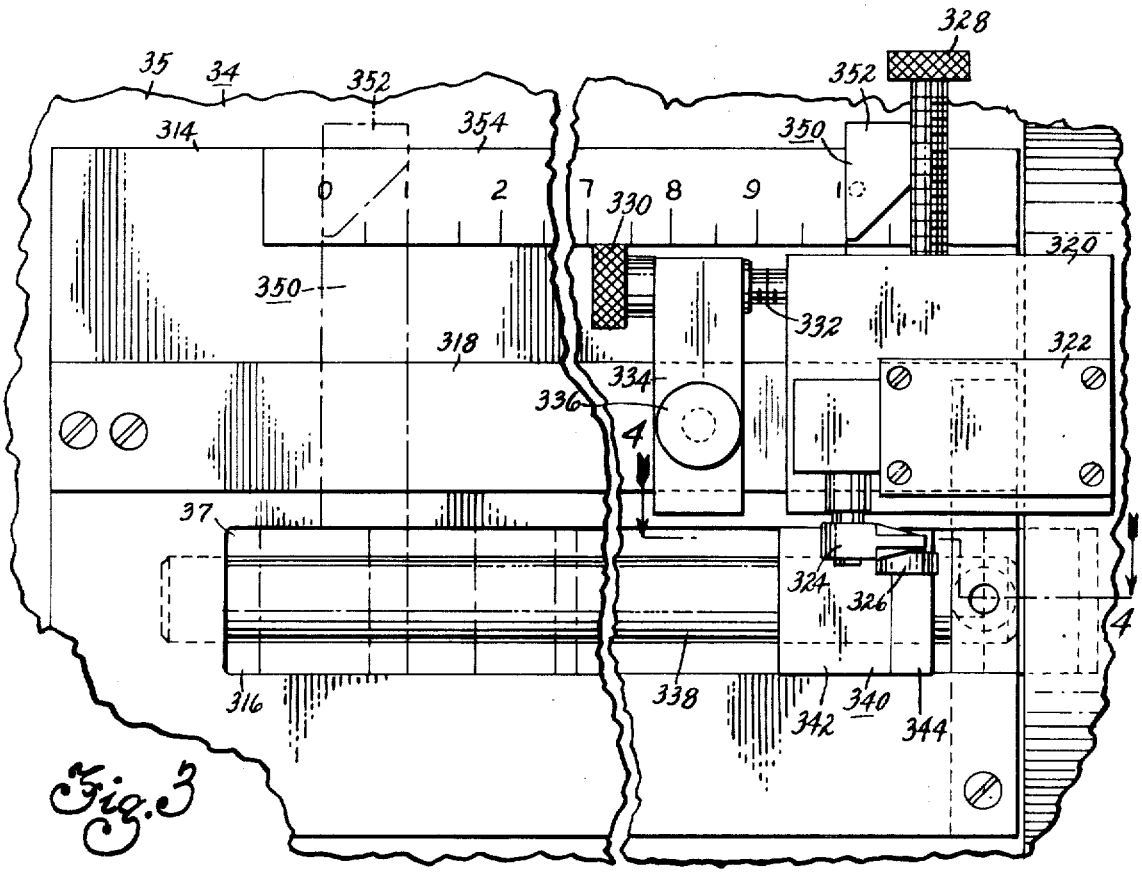
FIG. 3 is an enlarged fragmentary view of the injection unit stroke adjusting means also shown in FIG. 1.

As shown in FIG. 1 but best seen in FIG. 3, which is an enlarged fragmentary view of the injection unit stroke adjusting means shown in FIG. 1, attached to but spaced from front side 35 of housing 34 having opening 37 is mount plate 314 having generally rectangular opening 316. Attached to but spaced from mount plate 314 above opening 316 is guide bar 318 carrying thereon limit switch bracket 320 having secured thereon limit switch 322 of known construction including movable arm 324 and roller 326. Limit switch bracket 320 which is capable of being moved longitudinally on guide bar 318 is adjustably secured thereon by lock screw 328. Minute adjustments of limit switch bracket 320 are made by turning knob 330 of adjusting screw 332 which is threaded into limit switch bracket 320 but journaled in bracket 334 also capable of longitudinal movement on guide bar 318 and adjustably secured thereon by lock screw 336.

Figure 4:
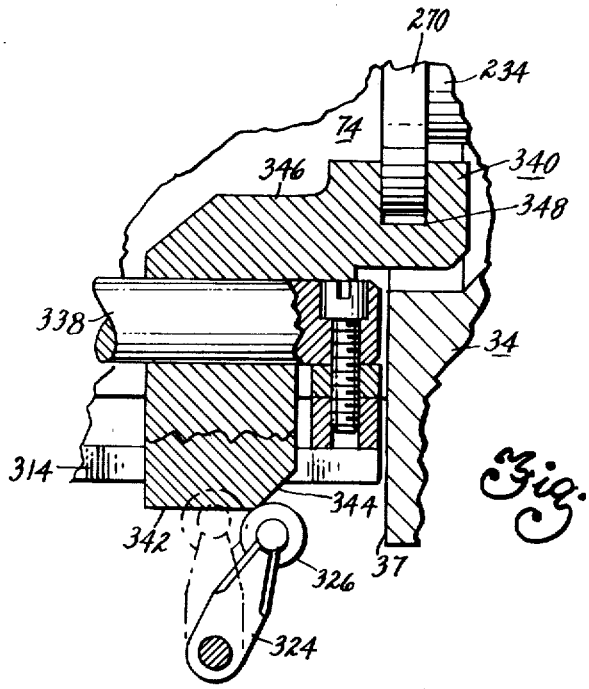
FIG. 4 is a sectional view taken in the direction of arrows 4—4 in FIG. 3.

FIG. 4, which is a sectional view taken in the direction of arrow 4—4 in FIG. 3, shows slide bar 338 attached behind, but spaced from, mount plate 314. Slide bar 338 is located in housing opening 37 with its longitudinal center line lying in a plane which is perpendicular to mount plate 314 and also passes through the longitudinal center line of mount plate opening 316.

Surrounding slide bar 338 is cam follower 340 having cam portion 342 including integral cam surface 344, with cam portion 342 extending into and slidingly fitting within mount plate opening 316. Cam follower rear receiving portion 346 having slot 348 therein extends into housing cavity 74, with an outer portion of cam 270, attached to driving cap concentric portion 234, being able to rotate through slot 348.

Pointed 350 shown in FIGS. 1 and 3 has its inner end (not shown) attached to cam follower rear receiving portion 346 while its outer end 352 is spaced from scale 354 attached to mount plate 314 above and parallel with slide bar 338.

In operation, motor means 92, preferably a low speed high torque hydraulic motor, by means of internal driving splines 166 mating with drive shaft first splined portion 226, rotates drive shaft 210 journaled in rolling element bearings 170 and 198. Drive shaft second splined portion 228, slidingly fitting through annular drive spline extension 256 into driving cap internally splined bore 244, rotates driving cap 232 and by reason of plasticizing screw spindle end splined portion 72 mating with and axially retained by stop plate 268 in driving cap splined bushing 262 retained in driving cap concentric bore 248 thereby rotates plasticizing screw 54. Thus it may be seen that rotation of plasticizing screw 54 by motor means 92 is in a direct in-line manner, with motor means 92, drive shaft 210, driving cap 232 and plasticizing screw 54 all being axially aligned. Drive shaft 210, in addition to rotating driving cap 232, also serves as the output shaft of motor means 92. Rotation of driving cap 232 in addition to rotating plasticizing screw 54 also rotates annular cam 270 and annular double-acting piston 274 attached to driving cap portion 234. In rotation, piston skirt outer peripheral surface 292 is journaled on inner peripheral surface 310 of stationary retainer ring 296 and piston head portion 278 is journaled on injection cylinder inner peripheral surface 102 by outer peripheral surface 312 of movable retainer ring 300 attached to piston head portion stepped top surface 284. Therefore, rotation of plasticizing screw 54 by driving cap 232 also causes rotation of attached annular double-acting piston 274, with sleeve 180, fixed to stationary end cap 88, freely extending for a substantial distance between piston inner peripheral surface 288 and driving cap portion 240.

As plasticizing screw 54 rotates, the molding material entering into plasticizing cylinder 38 is transported to the left as viewed in FIG. 1 and is deposited in front of plasticizing screw tip 66. As the plasticized material is deposited in front of screw tip 66, it develops a back pressure that forces plasticizing screw 54 to axially retract (to the right as viewed in FIGS. 1 and 2) in relation to plasticizing cylinder 38, thereby also axially retracting driving cap 232 and piston 274, the former sliding on drive shaft second splined portion 228, the latter having piston skirt outer peripheral surface 292 sliding on retainer ring inner peripheral surface 310 and retainer ring outer peripheral surface 312 sliding on injection cylinder inner peripheral surface 102. In addition, as previously noted, piston rings 298 in stationary retainer rings 294, 295, 296 bear and seal against piston skirt outer peripheral surface 292, piston rnigs 299 in piston head outer circumferential recesses 280 bear and seal against injection cylinder inner peripheral surface 102, and piston rings 308 in retainer ring 304 and movable retainer ring 300 respectively, bear and seal against sleeve outer peripheral surface 188. When the plastic material in front of screw tip 66 reaches a predetermined volume, or shot size, cam follower 340, which is axially moved along side bar 338 by annular cam 270, contacts and moves limit switch roller 326 on limit switch arm 324 with its cam surface portion 344, thereby tripping limit switch 322 on limit switch bracket 320 which had previously been axially adjusted on guide bar 318 so as to limit the length of axial retraction of plasticizing screw 54 to give the correct shot size. Tripping of limit switch 322 provides a signal for a switching means (not shown) of known construction which stops the rotation of motor means 92.

Upon receipt of another signal, emanating for example from mold 16 and confirming that it is ready for injection, fluid, from a fluid source under pressure (not shown) connected to end cap 88, is directed into and through end cap L-shaped openings 140, 142 against movable retainer ring flat front surface 305 thus axially displacing annular double-acting piston 274, and consequently driving cap 232 and plasticizing screw 54 to the left as viewed in FIGS. 1 and 2 thereby injecting the plasticized material in front of screw tip 66 through nozzle 48 into mold 16. Piston 274 is axially displaced until piston head portion bottom surface 286 mechanically abuts rear surface 291 of stationary retainer ring 296. Upon mechanical abutment of surfaces 286 and 291 driving cap 232 and annular cap 270 are axially moved into the positions shown (in FIG. 2) in phantom lines in housing cavity 74. Even after abutment of surfaces 286 and 291 fluid pressure is maintained for a predetermined time on movable retainer ring front flat surface 305. Upon receipt of another signal, for example from a timer (not shown) the fluid pressure on surface 305 is released and motor means 92 is again actuated thus rotating plasticizing screw 54 which starts plasticizing molding material entering into piston cavity 38 thereby forcing plasticizing screw 54 to start axially retracting (to the right as viewed in FIGS. 1 and 2). Starting of axial retraction of plasticizing screw 54 also starts axial retraction of piston 274 thereby starting to force the fluid in the piston head cavity, defined by injection cylinder inner peripheral surface 102, sleeve outer peripheral surface 188, movable retainer ring front surface 305 and end cap front end surface portion 130, out therefrom through end cap L-shaped openings 140, 142 and through an adjustable relief valve (not shown) back to a reservoir (not shown). The distance between stationary retainer ring rear surface 291 and piston head portion bottom surface 286 when piston 274 is in rearmost position, i.e., when movable retainer ring front surface portion 305 abuts end cap front end surface stepped portion 130 is the maximum stroke length of piston 274 which is also the maximum axial stroke length of cam follower 340, with limit switch bracket 320, carrying limit switch 322, being infinitely variably adjustable over this stroke length. Depending on the shot size required, limit switch bracket 320 is set for a predetermined stroke length on guide bar 318, as previously described. Tripping of limit switch 322 stops rotation of motor means 92 and the injection molding machine is now ready for another cycle as just described. Thus plasticizing screw 54 reciprocates once per machine cycle to plasticize and inject a shot of material.

If axial retraction without rotation of plasticizing screw 54 is desired, fluid, from a fluid source under pressure (not shown) connected to injection cylinder 86, is directed into and through injection cylinder radial openings 106, 108 into the piston skirt cavity, defined by injection cylinder inner peripheral surface 102, piston skirt outer peripheral surface 292, piston head portion bottom surface 286 and stationary retainer ring rear surface 291, thereby axially retracting piston 274 (to the right as viewed in FIGS. 1 and 2). Partial or full retraction of plasticizing screw 54 is obtained by means of external valving (not shown). Upon subsequent axial advance of plasticizing screw 54, (to the left as viewed in FIGS. 1 and 2), the fluid in the piston skirt cavity is forced out therefrom through injection cylinder radial openings 106, 108 and through a relief valve (not shown) back to a reservoir (not shown).

As previously noted, piston rings 298 bear and seal against piston skirt outer peripheral surface 292 and piston rings 299 bear and seal against injection cylinder inner peripheral surface 102, but if fluid should leak past piston rings 299 and/or piston rings 298 and retainer inner peripheral surface 118, it will enter peripheral channel 303 from whence it will flow through retainer radial opening 122 into a reservoir (not shown) connected thereto. Piston rings 308 bear and seal against sleeve outer peripheral surface 188 but if fluid should leak past piston rings 308 it will flow between piston inner peripheral surface 288 and sleeve outer peripheral surface 188 around the unsecured end of fixed sleeve 180 between sleeve inner peripheral surface 184 and driving cap portion 240 and wholly or in part either continue therebetween to the end of drive spline extension 256 or enter driving cap concentric internally splined bore 244 through opening [256] *246* and flow therebetween and drive shaft second splined portion 228 to the end of drive spline extension 256 from whence it will enter through sleeve radial openings 192, 194 into annular channel 196 and flow through end cap radial opening 138 into a reservoir (not shown) connected thereto.

Radial opening 246 in driving cap concentric portion 240 also allows communication between driving cap splined bore 244 and the cavity resulting between driving cap concentric portion 240 and piston inner peripheral surface 288 during axial displacement of annular piston 274.

The use of fixed sleeve 180 in this invention permits sealing of piston inner peripheral surface 288 by piston rings 308 against smooth sleeve outer peripheral surface 188. This construction is most significant since if fixed sleeve 180 were not interposed between piston 274 and driving cap 232, even if driving cap 232 and piston 274 were of unitary construction, they would have to seal against drive shaft second splined portion 228. Sealing against a spline is always difficult and axial advancement of piston 274 would result in almost certain leakage of fluid into splined bore 244 from whence it would again have to be displaced by leakage past drive shaft second splined portion 228 upon axial retraction of piston 274. In addition, this return leakage from splined bore 244 would produce a rearward reaction (to the right as viewed in FIG. 2) on the end surface of drive shaft second splined portion 228 and would necessitate incorporation of a thrust race or bearing in end cap 88 or motor means 92. The use of fixed sleeve 180 eliminates these difficult drive shaft sealing and end thrust problems. The end thrust created by piston head portion bottom surface 286 abutting rear surface 291 of stationary retainer ring 296 is readily taken by retainer end surface 116 and the end thrust created when movable retainer ring flat front surface [205] *305* abuts end cap front end surface stepped portion 130 is readily taken by end cap 88.

While this invention has been described in connection with possible forms or embodiments thereof, it is to be understood that the present disclosure is illustrative rather than restrictive and that changes or modifications may be resorted to without departing from the spirit of invention or scope of the claims which follow.

What is claimed is:

1. In an injection molding machine of the type wherein a rotatable plasticizer screw is advanced axially toward an injection mold to fill the mold and retracted axially to accumulate the next successive mold filling charge, the improvement comprising:

(a) a drive shaft;
(b) means for rotating said drive shaft;
(c) a driving cap concentric with and connecting said drive shaft and the screw, and securing said drive shaft and the screw for co-rotation but accommodating relative axial movement between said driving cap and said shaft;
(d) a sleeve fixed on one end and concentric with and surrounding a substantial length of said driving cap;
(e) a piston concentric with said sleeve, surrounding a substantial length of the non-fixed portion of said sleeve, and attached on one end to said driving cap; and
(f) a fluid pressure actuated cylinder peripherally surrounding said piston, with said sleeve being fixed relatively to said cylinder, whereby said screw is axially displaceable relative to said drive shaft and both axially and rotationally displaceable with said piston.

2. An injection molding machine comprising in combination:

(a) a plasticizing chamber with a through passage;
(b) a nozzle thereon for connection to a mold;
(c) a plasticizing screw in the passage;
(d) means for admitting molding material to the plasticizing screw;
(e) a driving cap, capable of simultaneous rotation and axial displacement, secured to the plasticizing screw;
(f) a rotatable drive shaft, slidingly secured to the driving cap;
(g) motor means for rotating said drive shaft;
(h) a rotatable, longitudinally displaceable piston secured to and spatially surrounding a substantial portion of said driving cap;
(i) a fluid pressure actuated cylinder surrounding said piston; and
(j) a sleeve fixed on one end relative to said cylinder and extending for a substantial distance between said piston and said driving cap, whereby said screw is axially displaceable relative to said drive shaft and both axially and rotationally displaceable with said piston.

3. An injection molding machine comprising in combination:

(a) a plasticizing chamber with a circular through passage;
(b) a nozzle thereon for connection to a mold;
(c) a plasticizing screw in the passage;
(d) means for admitting molding material into the plasticizing chamber;
(e) a stepped cylindrical driving cap, capable of simultaneous rotation and axial displacement, axially aligned and attached to the screw and including a splined portion;
(f) a rotatable drive shaft including a splined portion in axially aligned and axially displaceable intermeshing relationship with said driving cap splined portion;
(g) motor means attached to and coaxial with said drive shaft for rotating said drive shaft;
(h) a stepped cylindrical piston, capable of simultaneous rotation and axial displacement, secured to and coaxial with said driving cap, with a substantial length of said piston being radially spaced from said driving cap;
(i) a fluid pressure actuated cylinder peripherally encompassing said piston; and
(j) a sleeve fixed on one end relatively to said cylinder and coaxial with and extending for a substantial length between said driving cap and said piston.

4. The injection molding machine of claim 3 wherein said plasticizing screw, driving cap, drive shaft, motor means, cylinder and sleeve are all axially aligned.

5. The injection molding machine of claim 3 wherein said drive shaft is the output shaft of said coaxial motor means which is secured on the end of the cylinder remote from said plasticizing screw.

6. The injection molding machine of claim 3 wherein said stepped piston has a head portion and a recessed skirt portion, with the end of the skirt portion being attached to said driving cap.

7. The injection molding machine of claim 6 including at least one retainer ring interposed between the sleeve and cylinder and fixedly secured to the piston head portion.

8. The injection molding machine of claim 6 including a plurality of outer peripheral piston rings retained in said piston head portion, sealingly engaging the inner peripheral surface of said cylinder, and a plurality of inner peripheral piston rings in said piston head portion sealingly engaging the outer peripheral surface of said fixed sleeve.

9. The injection molding machine of claim [3] *6* including at least one stationary retainer ring sealingly interposed between the piston skirt [potrion] *portion* and the cylinder, near the cylinder end close to the plasticizing screw.

10. The injection molding machine of claim 9 including at least one inner peripheral piston ring retained in each retainer ring and sealingly engaging the exterior surface of said piston skirt portion.

*11. The injection molding machine of claim 3 wherein the splined portion of said driving cap is an internal spline and the splined portion of said drive shaft is an external spline.*

*12. The injection molding machine of claim 11 wherein said sleeve includes at least one radial aperture therethrough positioned near the fixed end thereof and providing communication between the interior of said sleeve and a fluid reservoir to permit the relief of pressure caused by leakage into the interior of said stepped cylindrical piston of pressurizing fluid used to actuate said piston.*

References Cited

The following references, cited by the Examiner, are of record in the patented file of this patent or the original patent.

UNITED STATES PATENTS

| | | | |
|---|---|---|---|
| 3,188,691 | 6/1965 | Stenger | 425—146 |
| 3,319,298 | 5/1967 | Kiraly | 425—145 |
| 3,163,693 | 12/1964 | Stenger | 425—245 X |
| 3,425,096 | 2/1969 | Morse | 425—245 X |
| 3,068,521 | 12/1962 | Gaspar et al. | 425—247 |
| 3,101,512 | 8/1963 | Goller. | |
| 3,224,301 | 12/1965 | Vickers. | |

FOREIGN PATENTS

| | | |
|---|---|---|
| 1,432,146 | 2/1966 | France. |
| 1,185,808 | 1/1965 | Germany. |
| 861,911 | 3/1961 | Great Britain. |
| 909,449 | 10/1962 | Great Britain. |
| 1,046,397 | 10/1966 | Great Britain. |
| 1,094,037 | 12/1967 | Great Britain. |

J. SPENCER OVERHOLSER, Primary Examiner

D. B. SMITH, Assistant Examiner

U.S. Cl. X.R.

425—147